3,279,087
SOLID POLYMER AND LIQUID DILUENT
SEPARATOR APPARATUS AND METHOD
Richard A. Hearne and Ralph Cox, Pasadena, Tex., and
Robert G. Wallace, Tokyo, Japan, assignors to Phillips
Petroleum Company, a corporation of Delaware
Filed Nov. 8, 1963, Ser. No. 322,332
4 Claims. (Cl. 34—12)

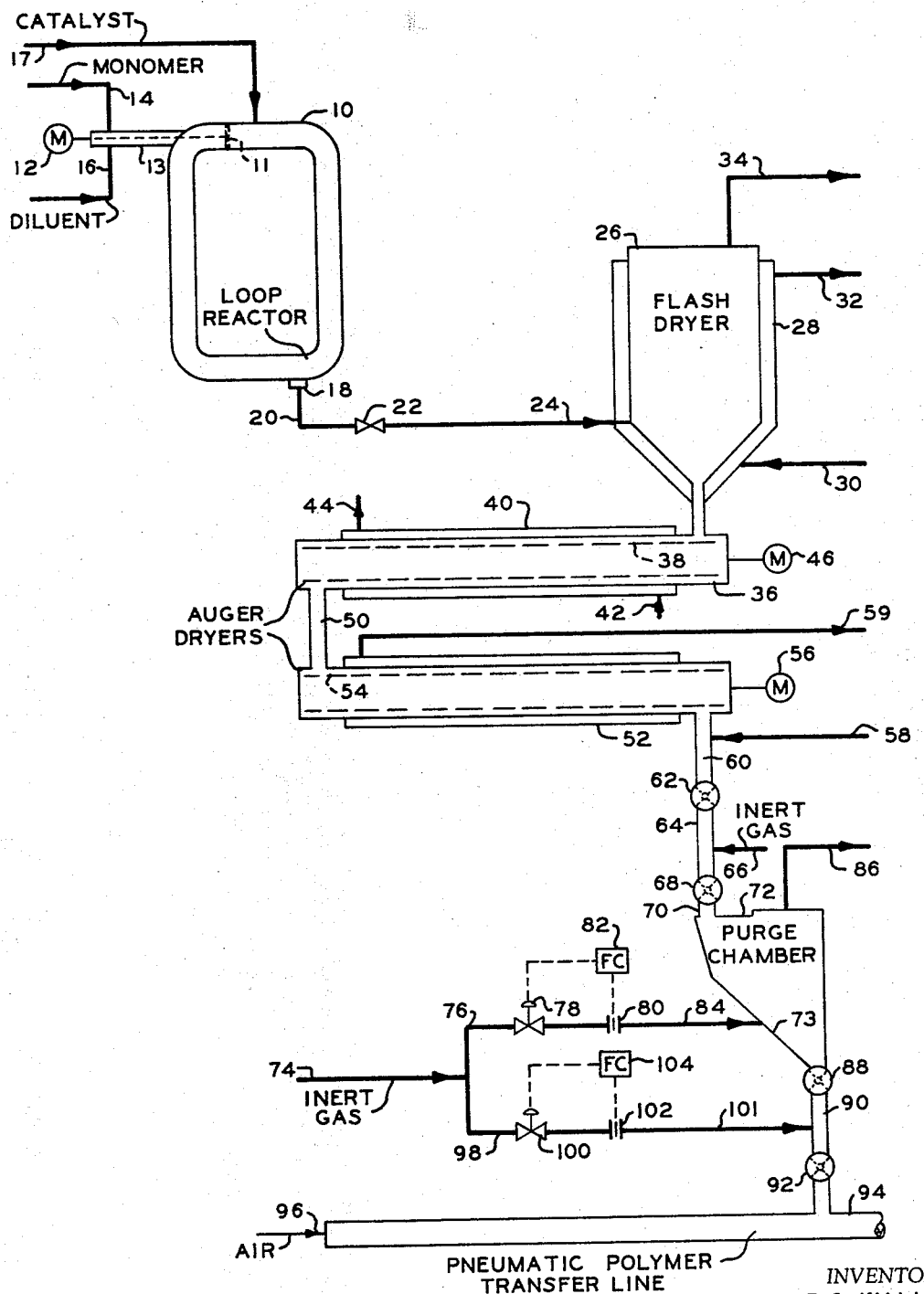

This invention relates to a method and apparatus for separating solid polymer and liquid diluent from a mixture of these materials. In another aspect the invention relates to a method and apparatus for separating solid polymer from liquid diluent and transferring the dry polymer to a pneumatic transfer system.

In many polymerization processes for the production of normally solid polymer, a stream is formed which is a slurry of particulate polymer suspended in a liquid medium, ordinarily the reaction diluent. For example, in the polymerization of ethylene in a hydrocarbon diluent under controlled conditions of temperature and pressure, a slurry of nonagglomerating solids in the diluent may be formed which has been called particle form polymer. In this process, or other processes in which the polymer is prepared in solution and subsequently precipitated upon the slurry, there is the problem of separating the solid polymer from the liquid diluent. A convenient method is by flashing the hydrocarbon into a vapor by reducing the pressure on the slurry. However, this method does not ordinarily effect complete removal of the hydrocarbon from the polymer and the solids retain residual amounts of diluent which must be removed before the polymer can be handled in the atmosphere with safety. This is particularly important to prevent explosion when the polymer is to be subsequently transferred by pneumatic conveying means.

It is an object of the invention to provide method and apparatus for separating solid polymer and liquid diluent.

It is another object of the invention to provide method and apparatus for the drying of solid polymer containing residual or adherent liquid.

Yet another object of the invention is to provide method and apparatus for transferring solids containing residual diluent to a pneumatic polymer transfer line.

These and other objects of the invention will be readily apparent to those skilled in the art from the accompanying disclosure, drawing and appended claims.

Broadly these objects are accomplished by method and apparatus which remove diluent associated with polymer solids by passing a layer of said solids downwardly and laterally through a drying zone while passing an inert gas upwardly therethrough.

In one embodiment the liquid diluent is first evaporated from the solids in a flash zone thereby forming a stream of polymer solids carrying residual diluent and then the solids are passed through a drying zone wherein the bulk of the residual diluent is removed by the application of mechanical energy and indirect heat exchange such as passing the solids through an auger conveyor while passing therethrough an inert noncombustible gas. Any readily available noncombustible inert gas such as carbon dioxide or mixtures of carbon dioxide and nitrogen can be employed to strip residual hydrocarbon from the polymer solids. These solids, containing small amounts of residual solvent or diluent which would be sufficient to be explosive in an air atmosphere, are passed to a pneumatic polymer transfer line by first passing same through a channel into which an inert noncombustible gas is introduced at a velocity and a pressure sufficient to prevent any passage of air upwardly into the dryers. The solids containing small amounts of adherent liquid are introduced into a purge chamber and formed into a layer of solids which pass laterally and downwardly toward the discharge end of a purge chamber with an inert gas being introduced upwardly through the layer of solids to remove all traces of residual diluent.

The apparatus of our invention includes a flash chamber, means for feeding the slurry of polymer in liquid hydrocarbon to this chamber, a dryer-conveyor connected to the lower portion of the flash chamber, a connecting conduit between said dryer-conveyor and a purge chamber, means for introducing a gas to said connecting conduit through said dryer, means for forming a layer of solids in said purge chamber, means for introducing an inert noncombustible gas to the lower portion of said purge chamber through said layer and means for connecting said purge chamber to a pneumatic polymer transfer line.

The method and apparatus of our invention can used in any process requiring a separation of solids from a mixture of these solids with a normally liquid diluent. It is particularly valuable where the diluent is an inflammable hydrocarbon which is recovered for reuse in a catalytic polymerization process. Many olefin polymerization processes produce such a slurry where separation of this type is required. Of particular importance in this field are polymerization processes such as those described in the patent of Hogan et al., U.S. 2,825,721, issued March 4, 1958. Our invention is especially useful in a process wherein the reactor effluent is a suspension of solid particulate polymer in a liquid hydrocarbon diluent. In one such process ethylene, or mixtures of ethylene with other unsaturated hydrocarbons, are contacted with a suspension of chromium oxide-containing catalyst in a liquid hydrocarbon diluent, the contacting occurring at a temperature such that substantially all of the polymer produced is insoluble in the diluent and in solid particle form, the particles being substantially non-tacky and non-agglutinative and suspended in the liquid diluent. The olefins employed are 1-olefins having up to 8 carbon atoms per molecule and no branching nearer the double bond than the 4-position. Examples of these materials include propylene, butene-1, 1-pentene, 1-octene, and 1,3-butadiene. The liquid hydrocarbon diluents which are suitable include paraffins having 3 to 12, preferably 3 to 8 carbon atoms per molecule, such as propane, n-butane, n-pentane, isopentane, n-hexane, isooctane and the like. Some naphthenes can be present in the diluent and mixtures of paraffins and isoparaffins can be employed. Naphthenic hydrocarbons having from 5 to 6 carbon atoms in a naphthenic ring which can be maintained in a liquid phase under the polymerization conditions can be employed such as cyclohexane, cyclopentane, methylcyclopentane, ethylcyclohexane, and the like. The temperature of the polymerization depends upon the hydrocarbon diluent chosen and is generally in the range of about 230° F. and below. The pressure of the reaction is sufficient to maintain the diluent in a liquid phase and is normally about 100 to 700 p.s.i.a. A slurry containing as high as 55 weight percent particulate polymer in the hydrocarbon diluent can be formed by this process and treated according to this invention.

To describe our invention further, reference is now made to the drawing, in which the sole figure illustrates a schematic flow diagram and apparatus features of our invention.

The polymerization is carried out in a loop reactor 10. The polymerization mixture is circulated by agitator 11 which is powered by motor 12, the shaft of the agitator passing into the loop reactor through conduit 13. Monomer and diluent are introduced through conduits 14 and 16, respectively, connected to conduit 13. Feed materials can be introduced at other points in reactor 10. In this embodiment catalyst is added through conduit 17 connected directly to reactor 10. Normally, catalyst is introduced as a suspension in hydrocarbon diluent. Very high ratios of polymer to catalyst can be formed by this process, for example, as high as 10,000 pounds of polymer per pound of catalyst. A slurry of polymer in the hydrocarbon diluent is formed within the reactor.

Polymer slurry is removed from the loop to a settling leg 18. The slurry then passes from settling leg through conduits 20, valve 22 and conduit 24 into flash chamber 26. Chamber 26 is preferably a vertically elongated vessel having a conical bottom section to facilitate removal of solid polymer particles and encircled by heat exchange jacket 28 through which a heat exchange fluid is passed through conduit 30 and exits through conduit 32. Alternatively, the vessel 26 is encircled by a heat exchange coil through which hot water or low pressure steam can be circulated to prevent heat loss from the flash vessel and increase the evaporation of hydrocarbon diluent from the polymer.

It is also desirable in many situations to provide a means for the removal of deposits of polymer from the flash chamber walls. This may be suitably provided by a rotatable support member (not shown) having attached thereto near the walls of the vessel a plurality of chains. These chains depend freely from the support member in contact with the walls of the vessel so that when the support member is rotated these chains rub against the wall of the flash chamber and thereby prevent polymer deposits from accumulating. The support member can be a disc, a wheel or a plurality of radial arms rotated by a motor or the like.

Solid polymer carrying residual amounts of diluent is removed from the bottom of the flash chamber and falls into an auger-conveyor 36. This conveyor is equipped with a jacket 40 to which hot water or other heat exchange fluid can be circulated. Hot water is passed from its source of supply through conduits 42 to the jacket leaving through conduit 44. The conveyor 36 contains an auger 38 which is powered by motor 46. As the polymer solids are moved by the auger additional diluent is evaporated because of the heat added from the hot water jacket 29. These vapors pass into the flash dryer 26. The polymer solids are conveyed to the end of this conveyor and passed through channel 50 which may contain a rotary valve (not shown). The solids drop into a conveyor-dryer 52 which contains an auger 54 driven by motor 56. As the polymer solids are passed through conveyor 52 they are mechanically worked and contacted with the heated non-combustible inert gas introduced through conduit 58. This gas can be any non-combustible gas which is readily available such as carbon dioxide and nitrogen or mixtures of these gases or the like. This gas passes through conveyor 52, contacts the polymer solids while they are in motion and thereby evaporates residual amounts of hydrocarbon diluent from the polymer solids as well as purging previously evaporated diluent. These gases with the evaporated diluent pass from conveyor 52 through conduit 59 and then to a flare or the like.

To indicate the effectiveness of these individual dryers, it has been found that if a polymer slurry containing 50 percent polymer is passed into the flash chamber the effluent from the flash chamber will be 85 percent polymer. After passing through the first conveyor dryer the effluent will be 97 percent polymer. After passing through the second dryer the effluent will be 99.7 to 99.9 percent polymer. This very small amount of residual diluent is still sufficient to present a hazard if the polymer is then introduced into a pneumatic polymer transfer line. It also has been found necessary to provide for even more complete means for removal of extremely small amounts of residual diluent. This is accomplished by the use of a purge chamber through which the polymer solids are passed in the form of a thin layer, such as two inches or less, and through which layer the inert gas is passed upwardly therethrough to remove the very small amount of residual diluent.

To prevent the passage of even small amounts of hydrocarbon vapor from the second dryer to the purge chamber and to maintain the pressure in the system, it is generally advisable to employ an inert gas seal between two rotary star valves 62 and 68 in passageways 60, 64 and 70. An inert gas such as nitrogen, carbon dioxide and the like is introduced through conduit 66 at a pressure sufficient to prevent the passage of hydrocarbon vapor.

In this purge chamber 72 the solids preferably drop onto an inclined surface 73 and form a thin layer of solids through which an inert gas is passed upwardly therethrough and out through conduit 86. This inert gas then carries substantially all of the remaining residual diluent from the polymer so that the polymer solids exiting from chamber 72 is 100 percent solids. Preferably the depth of polymer maintained in the chamber is two inches or less although this will depend on the size of the solid particles, amount of adherent liquid, time in the purge chamber, temperatures, etc.

There will be some polymer fines removed in the purge chamber exit gas. For example, when the production is about 20,000 pounds per day about 25 pounds per day of polymer fines may be recovered from the purge chamber exit gas. Preferably the inlet temperature of the inert gas is about 100–110° F. Below 100° F. the inert gas will cause condensation of pentane. The temperature of the exiting gas is about 130–150° F. The pressure in the purge chamber is preferably atmospheric although subatmospheric pressures may be maintained. The amount of the inert gas employed will obviously depend upon the volume of solids employed but in the production of 20,000 pounds per day of polymer with a two-inch layer approximately 12 c.f.m. of inert gas is introduced to the purge chamber.

The inert gas is introduced through conduit 74, 76, valve 78 and conduit 84 onto the surface 73. The control of the amount of inert gas is effected by determining the flow rate by means of a flow measuring or flow sensing means 80 which transmits a signal to flow controlling means 82 which, in turn, actuates valve 78 to maintain the flow at the desired rate.

Polymer solids exiting from purge chamber 72 are then passed through a series of star valves 88 and 92 in channel 90. Again it is preferred that inert gas be introduced into channel 90 to prevent any possible transfer of hydrocarbon vapor into the pneumatic polymer transfer line 94. This gas is introduced through conduits 74, 98, valve 100 and conduit 101. The amount is controlled by flow sensing means 102, flow controller 104 and valve 100. The polymer solids are then transferred into the pneumatic polymer transfer line 94 by which the solids are transferred to a polymer product storage by means of air introduced through conduit 96.

To illustrate our invention further the following example is presented. The conditions and flow rates are presented as typical only and should not be construed to limit our invention unduly.

Ethylene at 630 pounds per hour, butene-1 at 45 pounds per hour and n-pentane at 685 pounds per hour are continuously fed to reactor 10 which is maintained at a temperature of 190° F. and a pressure of 465 p.s.i.a. Chromium oxide catalyst containing 2.5 weight percent chromium oxide on a 90/10 silica alumina support is fed to reactor 10 at a rate of 0.30 pound per hour. A slurry of the copolymer in n-pentane, containing about 20 weight percent solids, is formed in the reactor and concentrates in settling leg 18 to about 45 weight percent particulate ethylene-butene copolymer in n-pentane which is then passed in pulsating flow from settling leg 18 to flash chamber 26 operated at 3 p.s.i.g. and 150° F. Polymer solids containing about 12 weight percent residual pentane are passed through conveyor 36 and connecting conduit 50 into conveyor-dryer 52. Carbon dioxide is introduced to dryer 52 through conduit 58 at a rate of 27 pounds per hour and a temperature of 150° F. This stripping gas with residual pentane is passed through conduit 59 to a flare. Polymer solids at a rate of 635 pounds per hour are conveyed to purge chamber 72 and formed into a layer two inches deep through which an inert gas, carbon dioxide and nitrogen, is passed at 12 c.f.m. at a temperature of 100° F. exiting at a temperature of 130° F. The purge chamber is maintained at atmospheric pressure. Twelve c.f.m. of inert gas is introduced to the air slide.

While certain examples, structures, composition and process steps have been described for purposes of illustration, the invention is not limited to these. Variation and modification within the scope of the disclosure and the claims can readily be effected by those skilled in the art.

We claim:

1. A method for removing a liquid hydrocarbon diluent from polymer solids comprising evaporating hydrocarbon diluent from said solids in a flash zone thereby forming a stream of polymer solids carrying residual diluent, passing said solids from said flash zone to a drying zone, contacting said solids in said drying zone with a noncombustible gas while simultaneously mechanically working said solids thereby evaporating a substantial portion of the residual hydrocarbon diluent, passing the resultant solids containing residual diluent from said drying zone to a purge zone through a channel, forming a thin layer of polymer solids in said purge zone while passing said solids laterally and downwardly through said purge chamber, introducing an inert gas into the lower portion of the purge chamber which passes upwardly through said layer of polymer solids thereby removing all of the residual diluent adhering to the polymer solids, and introducing said resultant dried polymer solids into a pneumatic transfer line.

2. A method of removing a liquid hydrocarbon diluent from polymer solids comprising evaporating hydrocarbon diluent from said solids in a flash zone by reduction in pressure thereby forming a stream of polymer solids carrying residual diluent, passing said solids from said flash zone to a drying zone, contacting said solids in said drying zone with a noncombustible gas while simultaneously mechanically working said solids thereby evaporating a substantial portion of the residual hydrocarbon diluent, passing the resultant solids from said drying zone to a purge chamber through a channel into which is introduced an inert gas, forming a layer of polymer solids in said purge chamber of about 1 to about 3 inches in depth while transferring said solids from one end portion of said purge chamber to a lower opposite end portion of said purge chamber, introducing an inert gas upwardly through a lower portion of the purge chamber which passes through the layer of polymer solids at rate in the range of 5 to 50 c.f.m. and a temperature of 100–150° F., and removing the resultant dried polymer solids from the purge chamber and passing same through a channel containing a hydrocarbon seal through which an inert gas is introduced at a pressure sufficient to prevent passage of hydrocarbon vapor from the purge chamber downstream, said polymer solids passing through said channel into a pneumatic polymer transfer line.

3. Apparatus suitable for separating liquid hydrocarbon from particulate polymer comprising in combination a flash vessel, means for feeding a slurry of said polymer in said liquid hydrocarbon to said vessel, a dryer conduit means for connecting said dryer with said flash vessel, means within said dryer for mechanically working said polymer solids, means for removing hydrocarbon vapor from said dryer, means for introducing an inert noncombustible gas into said dryer, a channel means interconnecting the discharge end of said dryer and a purge chamber, a hydrocarbon seal means in said channel, means for introducing an inert gas into a lower portion of said purge chamber, means for forming an inclined layer of solids in said purge chamber, means for removing solids from the lower portion of said purge chamber, and a pneumatic polymer transfer line connected to said purge chamber through said means for removal of polymer solids.

4. Apparatus suitable for separating liquid hydrocarbon from particulate polymer comprising in combination a vertically elongated flash vessel, means for feeding a slurry of said polymer in said liquid hydrocarbon to said vessel, conduit means connecting a first conveyor-dryer and the lower portion of said flash vessel, means for heating said first dryer, a second channel means interconnecting said first dryer and a second auger-conveyor-dryer, means for mechanically working the polymer solids in said second auger-conveyor-dryer, conduit means for introducing an inert noncombustible gas into the discharge end portion of said second auger-conveyor-dryer, means for withdrawing said noncombustible gas with evaporated hydrocarbon from said second conveyor-dryer, a third channel means interconnecting said second dryer and a purge chamber, a first and a second rotary valve in series in said third channel, means for introducing an inert gas in said third channel between said first and second rotary valve, means for introducing an inert gas into a lower portion of said purge chamber, means within said purge chamber for forming an inclined layer of polymer solids, said solids transferring laterally and downwardly from the upper portion of said chamber to the lower discharge portion of said chamber, means for removing hydrocarbon vapor from said purge chamber, a third and fourth rotary valve in series in a fourth channel connecting said purge chamber and a pneumatic polymer transfer line and means for introducing inert gas between said third and fourth rotary valve.

References Cited by the Examiner

UNITED STATES PATENTS

| | | | |
|---|---|---|---|
| 2,833,750 | 5/1958 | Vickers | 34—12 X |
| 3,152,872 | 10/1964 | Scoggin et al. | 34—15 |
| 3,166,385 | 1/1965 | Pahlavouni | 34—36 X |
| 3,195,613 | 7/1965 | Hawkins | 159—47 |

FOREIGN PATENTS 608,159  11/1960  Canada.

FREDERICK L. MATTESON, JR., Primary Examiner.

WILLIAM F. O'DEA, Examiner.

C. R. REMKE, Assistant Examiner.